United States Patent [19]

Sakai et al.

[11] Patent Number: 5,479,645
[45] Date of Patent: Dec. 26, 1995

[54] PORTABLE COMPUTER CAPABLE OF SWITCHING CPU CLOCKS

[75] Inventors: Makoto Sakai; Makoto Arai, both of Tokyo, Japan

[73] Assignee: Kabushiki Kaisha Toshiba, Kanagawa, Japan

[21] Appl. No.: 958,030

[22] Filed: Oct. 7, 1992

[30] Foreign Application Priority Data

Oct. 11, 1991 [JP] Japan ................................. 3-264082

[51] Int. Cl.$^6$ .................................................. G06F 1/08
[52] U.S. Cl. ............................ 395/550; 364/DIG. 1; 364/231.1; 364/270.2
[58] Field of Search .................. 395/550; 364/DIG. 1, 364/DIG. 2

[56] References Cited

U.S. PATENT DOCUMENTS 5,086,387  2/1992  Arroyo et al. ........................ 395/550
5,167,031  11/1992  Watanabe ............................. 395/550

OTHER PUBLICATIONS

386 TM SL Microprocessor SuperSet Programmer's Reference Manual Intel discloses clock control on pp. 5–13 to 5–17.
386 TM SL Microprocessor System Design Guide Intel discloses clock control in chapter 14.3.2, pp. 14–15 to 14–18.

*Primary Examiner*—Thomas Heckler
*Attorney, Agent, or Firm*—Limbach & Limbach

[57] ABSTRACT

A CPU includes a register for setting a clock frequency and a frequency divider. The CPU sets an internal clock by frequency-dividing an externally supplied fundamental clock. A set of data set in the frequency setting register is selected through a setup menu displayed on a display unit. Of the data constituting the selected set, a default value is set in the register. When a predetermined key operation designating a frequency switching operation is detected by a detection circuit, the CPU updates the data set in the frequency setting register in accordance with the key operation, thereby changing the operating speed.

12 Claims, 7 Drawing Sheets

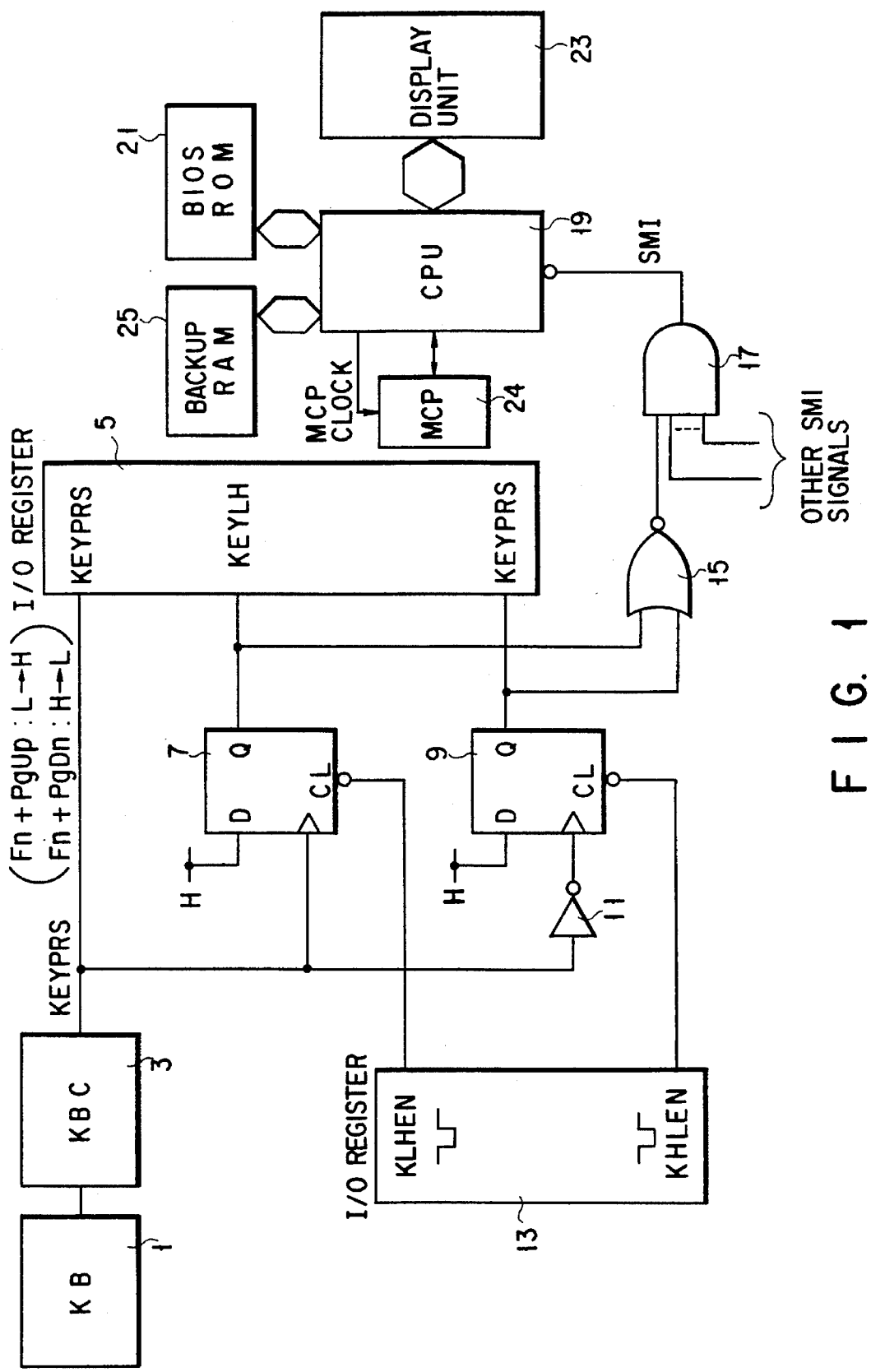
F I G. 1

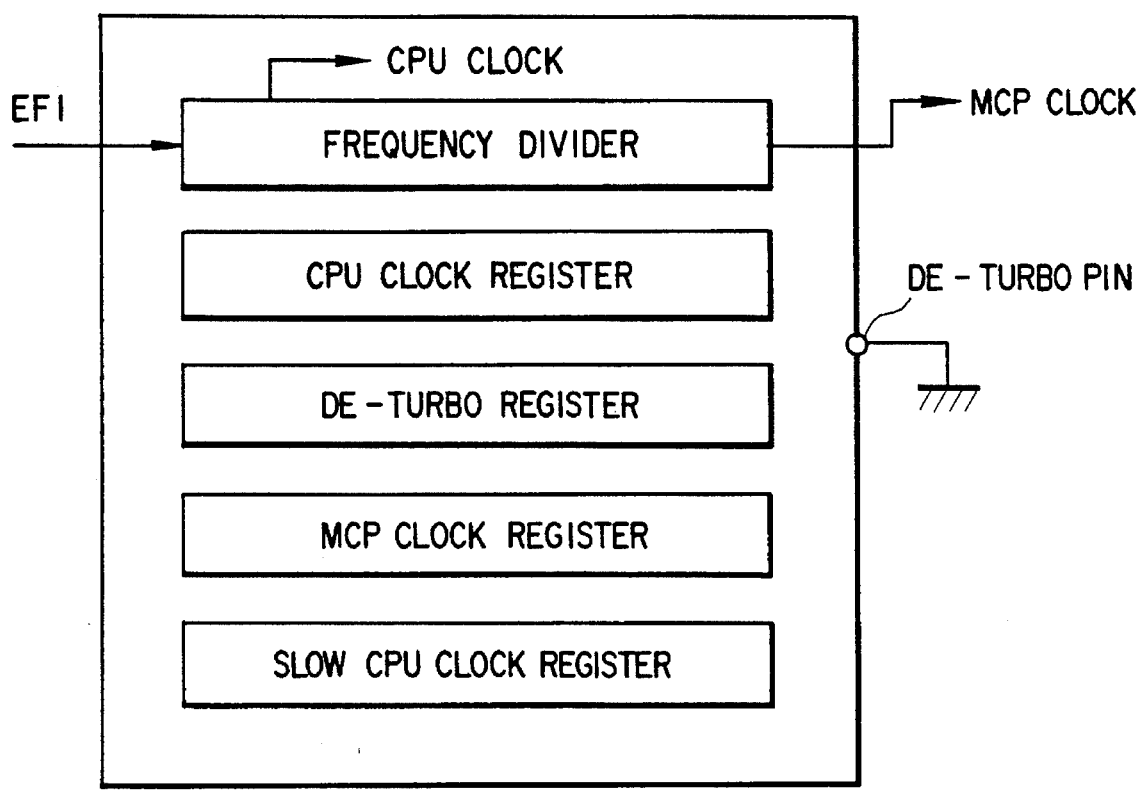
F I G. 2

|  | Fn + PgUp | Fn + PgDn |
|---|---|---|
| HIGH : | E F I (DEFAULT) | E F I / 4 |
| NORMAL : | E F I / 2 (DEFAULT) | E F I / 4 |
| LOW : | E F I | E F I / 4 (DEFAULT) |

| CPU CLOCK REGISTER | SLOW CPU CLOCK REGISTER | IDLE MCP CLOCK REGISTER |
|---|---|---|
| E F I | E F I | E F I |
| E F I / 2 | E F I / 8 | E F I / 8 |
| E F I / 4 | E F I / 8 | E F I / 8 |

PORTABLE COMPUTER CAPABLE OF SWITCHING CPU CLOCKS

BACKGROUND OF THE INVENTION

1. Field of the Invention

The present invention relates ton computer system using a one-chip CPU for generating CPU clocks by internally performing a frequency dividing operation on an externally supplied fundamental clock.

2. Description of the Related Art

In addition, the present invention relates to a system for arbitrarily switching CPU clocks generated inside a one-chip CPU which is designed to generate the CPU clocks by internally performing frequency dividing operation on an externally supplied fundamental clock.

A microprocessor which can generate various types of operation clocks by internally performing a frequency dividing operation on an externally supplied fundamental clock EFI has been developed and is commercially available (e.g., a microprocessor known as a 386SL (tradename) available from Intel Corporation).

For example a 386™SL microprocessor has a de-Turbo pin, a CPU clock register, and a de-Turbo register. In this microprocessor, either the CPU clock register or the de-Turbo register is selected in accordance with a switching signal externally supplied to the de-Turbo pin, and the frequency division ratio is changed in accordance with the value (frequency) set in the selected register, thereby changing the frequency of a clock for the microprocessor.

However, in the method of changing the clock frequency by selecting either the CPU clock register or the de-Turbo register in accordance with a signal supplied to the de-Turbo pin, after data are set in the respective registers, the clock frequency can only be changed in two steps. For this reason, it is difficult for a user to arbitrarily change the clock frequency. In addition, in the method using the de-Turbo pin, since only two types of data can be set in the de-Turbo register, the clock frequency cannot be freely changed.

For example, clocks generated by a microprocessor include clocks for a math coprocessor (e.g., a math coprocessor 387™SX available from Intel Corporation). However, the user cannot switch these clock frequencies as needed.

SUMMARY OF THE INVENTION

The present invention has been made in consideration of the above situation, and has as its object to provide a mechanism for arbitrarily switching clock frequencies generated by a microprocessor. The microprocessor is to generate necessary clocks by internally performing a frequency dividing operation on an externally supplied fundamental clock. Another object of the present invention is to provide a portable computer using the mechanism.

In order to achieve the above objects, according to the present invention, there is provided a portable computer comprising a one-chip microprocessor including a clock generating section which incorporates a clock frequency setting register. The clock generating section is designed to generate an operation clock by frequency-dividing an externally supplied fundamental clock in accordance with a value set in the register. The portable computer further comprises input means for inputting data designating a frequency switching operation of the operation clock, and means for detecting the data, input from the input means, which designates the frequency switching operation of the operation clock. The portable computer further comprises the value held in the register, thereby changing the frequency of the operation clock.

With the above-described arrangement, for example, the user can arbitrarily switch operation clock frequencies for the microprocessor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a circuit for changing the frequency of an internal clock of a CPU according to an embodiment of the present invention;

FIG. 2 is a block diagram showing a clock frequency control register incorporated in a microprocessor;

DETAILED DESCRIPTION OF THE PREFERRED EMBODIMENTS

Figures 3A, 3B:
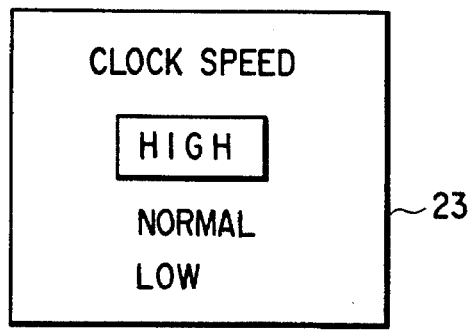
FIG. 3A is a view showing a pop-up menu for changing the frequency of the internal clock of the CPU.
FIG. 3B is a view showing data stored in a BIOS-ROM to change the clock frequency.

A portable computer according to an embodiment of the present invention will be described below with reference to the accompanying drawings.

FIG. 1 shows the arrangement of the portable computer of this embodiment.

Referring to FIG. 1, a keyboard controller (KBC) 3 detects a key operation of a keyboard (KB) 1. When a function key Fn and a page up key PgUp are operated, the KBC 3 changes an operation signal KEYPRS from low level to high level. When the function key Fn and the page down key PgDn are operated, the keyboard controller 3 changes the operation signal KEYPRS from high level to low level.

The operation signal KEYPRS is supplied to an I/O register 5, from which data is read out by a CPU 19, and the clock terminal of a first D flip-flop (DFF) 7. In addition, the operation signal KEYPRS is supplied to the clock terminal of a second D flip-flop (DFF) 9 through an inverter 11. The I/O register 5 is connected to the CPU 19 through a bus (not shown) so that the CPU 19 can read out data from the I/O register 5. High-level signals are respectively supplied to the D input terminals of the first and second DFFs 7 and 9.

Data KLHEN set in an I/O register 13 is supplied to the low active clear terminal of the first DFF 7. Data KHLEN set in the I/O register 13 is supplied to the low active clear terminal of the second DFF 9.

The CPU 19 and the I/O register 13 are connected to each other through a bus (not shown). The CPU 19 writes the data KLHEN and KHLEN in the I/O register 13.

Noninverted outputs Q from the first and second DFFs 7 and 9 are held in the I/O register 5 and are supplied to a NOR gate 15. A low active output from the NOR gate 15 is supplied to the SMI terminal of the CPU 19 through an AND gate 17 together with other SMI (system management interrupt; active low) signals.

Figure 5:
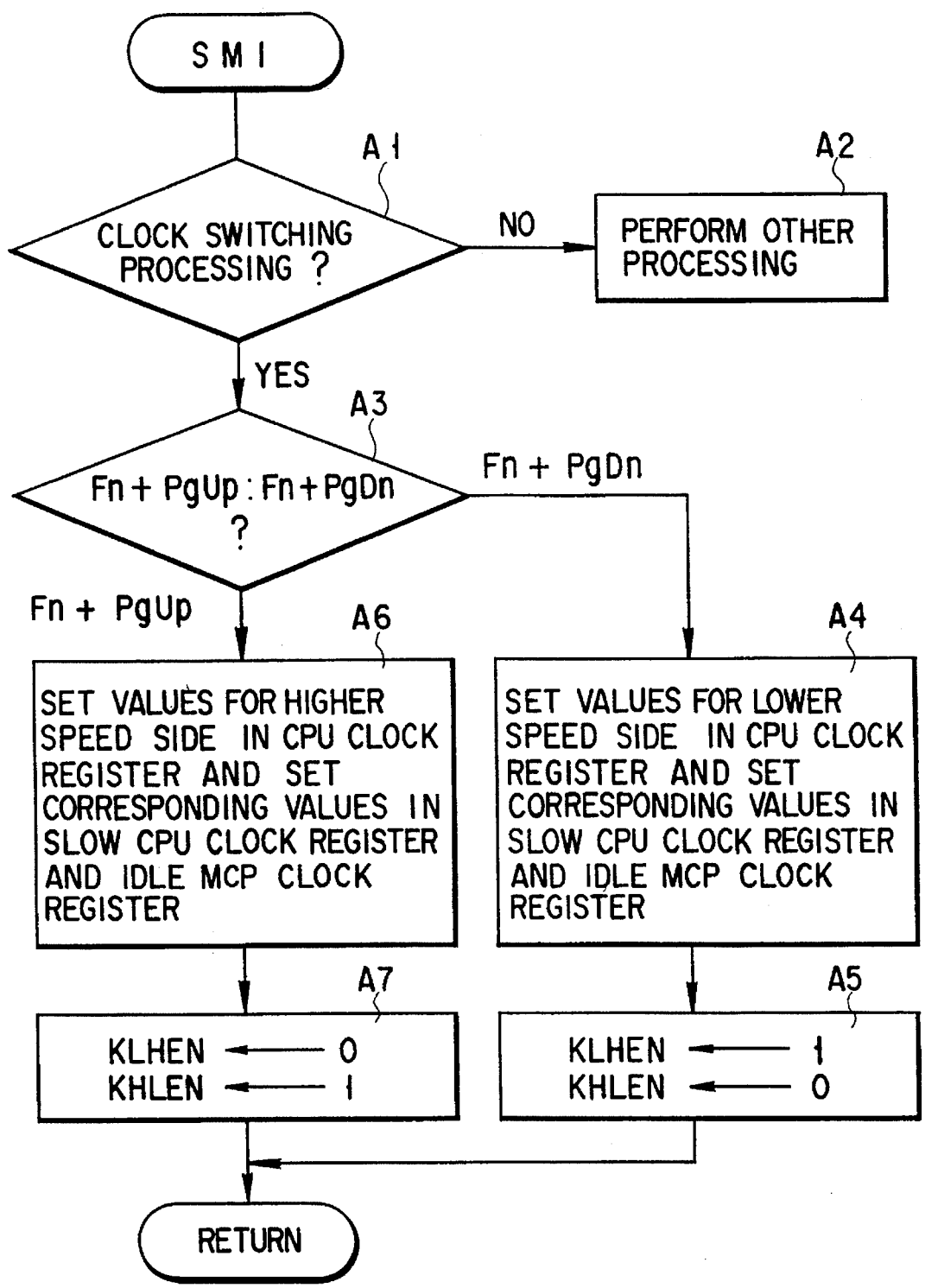
FIG. 5 is a flow chart for explaining an operation of changing the frequency of the internal clock of the CPU.

The CPU 19 performs processing based on a program stored in a BIOS (basic input/output system) ROM (read-only memory) 21, e.g., the control program shown in FIG. 5, in response to an interrupt signal supplied to the SMI terminal. The CPU 19 can generate CPU clocks by internally performing frequency dividing operation on an externally supplied clock EFI. For example, as the CPU in the embodiment, a CPU having an arrangement and a function equivalent to those of the 386™SL available from Intel Corporation may be used.

A display unit 23 is controlled by the CPU 19 to display the setup menu shown in FIG. 3A and the like. A backup RAM 25 is a memory backed up by a battery and designed to store values set through the setup menu and other values.

A math coprocessor 24 is connected to the CPU 19 as needed. The CPU 19 supplies a MCP clock, which is generated inside the CPU 19, to the math coprocessor 24. As an MCP, a coprocessor having an arrangement and a function equivalent to those of the 387™SX available from Intel Corporation may be used.

A main part of the internal arrangement of the CPU 19 of the embodiment will be described next. As shown in FIG. 2, the CPU 19 comprises a frequency divider for frequency-dividing the externally supplied fundamental clock EFI, a CPU clock register, a de-Turbo clock register, a slow CPU clock register, and an idle MCP clock register.

The CPU clock register serves to set the basic value of a clock frequency for the CPU, and can arbitrarily set basic frequencies EFI, EFI/2, EFI/4, and EFI/8.

The de-Turbo clock register is used in place of the CPU clock register in accordance with a signal supplied to a de-Turbo pin. The de-Turbo clock register can only set two values EFI/2 and EFI/4. In the embodiment, since the contents of the CPU clock register are arbitrarily updated, the de-Turbo register is not used. A fixed signal (ground voltage in FIG. 2) having a signal level selecting the CPU clock register is constantly supplied to the de-Turbo pin.

The slow CPU clock register serves to set a CPU clock in a hold state of the system bus. The idle MCP clock register is a register for setting the frequency of an MCP clock supplied to the math coprocessor 24 in an idle state.

A CPU clock setting operation in the computer having the above-described arrangement will be described next. In the embodiment, as clock frequencies for the CPU 19, the following sets of frequencies are prepared: (1) a set of EFI (default value) and EFI/4 for a high-speed mode; (2) a set of EFI/2 (default value) and EFI/4 for a normal mode; and (3) a set of EFI and EFI/4 (default value) for a low-speed mode. The user can select one of the sets through the setup menu.

The user can further select a frequency on a low- or high-speed side from the selected set upon a key operation.

The user causes the display unit 23 to display the setup menu shown in FIG. 3A, and operates the keyboard 1 to select one of the sets of frequencies for the high-speed, normal, and low-speed modes. Referring to FIG. 3A, the set for the high-speed mode is selected.

As shown in FIG. 3B, the BIOS-ROM 21 stores the set of EFI (default value) and EFI/4 for the high-speed mode, the set of EFI/2 (default value) and EFI/4 for the normal mode, and the set of EFI and EFI/4 (default value) for the low-speed mode.

Figure 4:
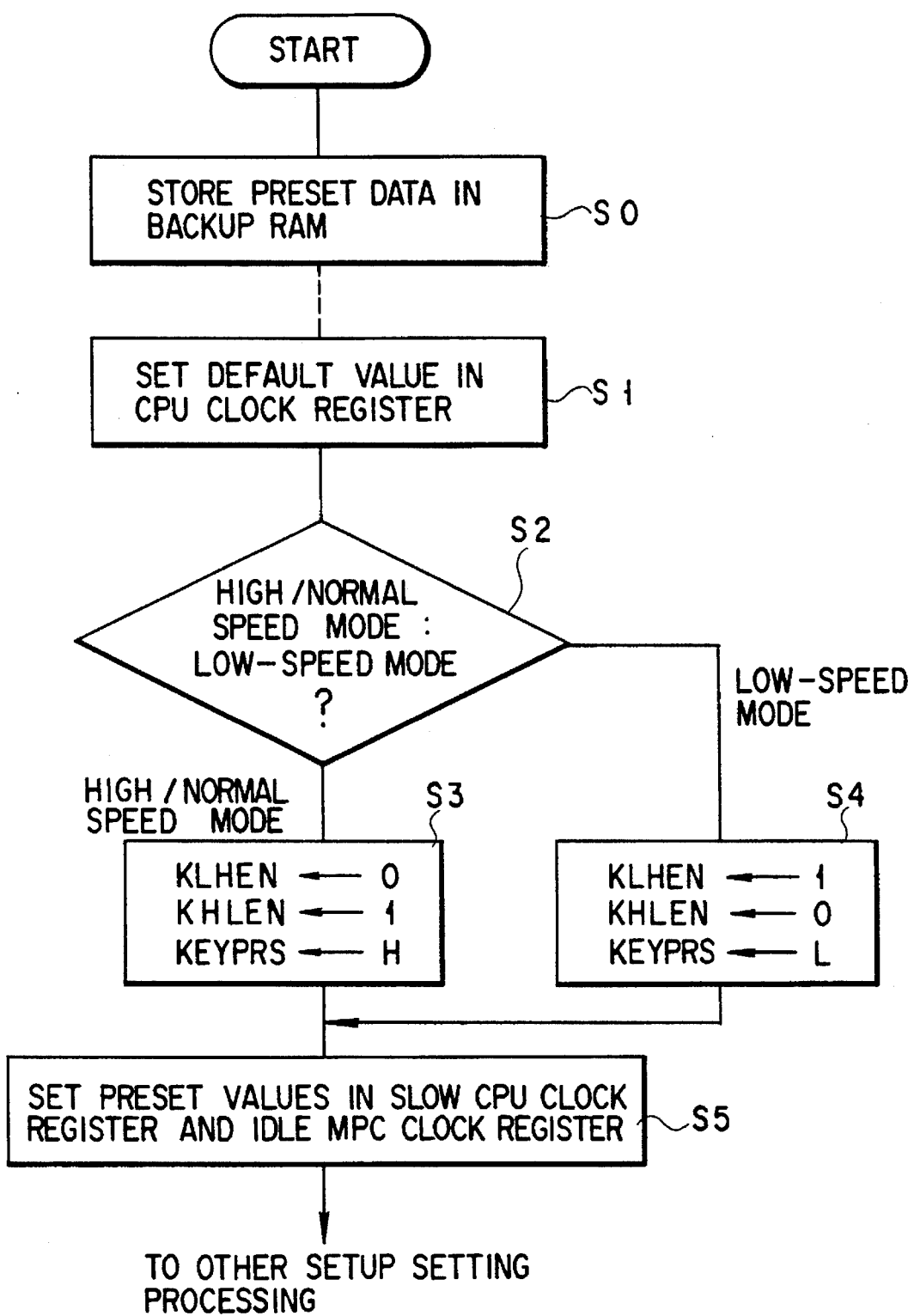
FIG. 4 is a flow chart for explaining an operation of setting data indicating the frequency of the internal clock of the CPU in the register.

When the setup screen is closed, the CPU 19 refers to the BIOS-ROM 21 on the basis of the set data on the setup menu, thus causing the backup RAM 25 to store the selected set, as shown in FIG. 4 (step S0). Thereafter, the CPU 19 sets the default value of the selected set in the CPU clock register on the basis of the set data stored in the backup RAM 25 (step S1). The CPU 19 checks whether the set selected through the setup screen is for the high-speed, normal, or low-speed mode (step S2).

If the selected set is for the high or normal-speed mode, the CPU 19 sets "0" as the data KLHEN and "1" as the data KHLEN in the I/O register 5, and issues a command to the keyboard controller 3 to set the operation signal KEYPRS at high level (step S3). If the selected set is for the low-speed mode, the CPU 19 sets "1" as the data KLHEN and "0" as the data KHLEN in the I/O register 13, and issues a command to the keyboard controller 3 to set the operation signal KEYPRS at low level (step S4).

When the data is written in the CPU clock register, the CPU 19 is subsequently operated by the designated clock frequency.

When the CPU clock is EFI, each of the values set in the slow CPU clock register and the idle MCP clock register is EFI. When the CPU clock is another value, each set value is EFI/8. These values are set in the BIOS-ROM 21 in advance, as shown in FIG. 3B. The CPU 19 refers to the value in the CPU clock register and the set data in the BIOS-ROM 21 so as to set the corresponding data in the slow CPU clock register and the idle MCP clock register (step S5). Thereafter, the CPU 19 performs setting processing of other setup data.

In the case shown in FIGS. 3A and 3B, the set of EFI (default value) and EFI/4 for the high-speed mode is set in the backup RAM 25 (step S0), and EFI as the default value is set in the CPU clock register (step S1). In addition, "0" as the data KLHEN and "1" as the data KHLEN are set in the I/O register 13, and the operation signal KEYPRS is set at high level (step S3). EFI is set in the slow CPU clock register and the idle MCP clock register (step S5).

Note that the values held in the CPU clock register, the slow CPU clock register, and the idle MCP clock register are set in accordance with the data stored in the backup RAM 25 when the system is rebooted.

A CPU clock changing operation will be described next with reference to FIG. 5.

Assume that the user operates the function key Fn and the page up key PgUp while the operation signal KEYPRS is at high level. Although this key operation is detected by the keyboard controller 3, since the operation signal KEYPRS is already at high level, its level does not change. As a result, the key operation is neglected.

Assume that the user operates the function key Fn and a page down key PgDn to switch the CPU clock to the lower-speed side in order to reduce the power consumption. This key operation is detected by the keyboard controller 3, which then outputs the operation signal KEYPRS of low level. The change in signal level of the operation signal KEYPRS from high level to low level is converted into a change from low level to high level by the inverter 11. The resultant signal is supplied to the clock terminal of the second DFF 9. In this case, since the data KHLEN is "1", the clear terminal of the DFF 9 is inactive. The second DFF 9 latches the high-level signal supplied to the D input terminal and outputs a high-level Q signal. This high-level Q signal is held, as the data KEYHL, in the I/O register 5. In addition, the high-level Q signal is supplied, as an active-level SMI (system management interrupt) signal, to the SMI terminal of the CPU 19 through the NOR gate 15 and the AND gate 17.

In response to this interrupt signal, the CPU 19 starts the SMI interrupt routine shown in FIG. 5. The CPU 19 checks first the contents of the I/O register 5 to specify the content of the SMI interrupt. More specifically, the CPU 19 detects that the data KEYHL is at "1" level and specifies that the SMI interrupt is caused by a clock switching operation (step A1). Note that if the SMI interrupt is caused by other factors, corresponding processing is performed (step A2).

The CPU 19 checks on the basis of the data held in the I/O register 5 whether the set of the function key Fn and the page up key PgUp or that of the function key Fn and the page down key PgDn is operated (step A3). In the embodiment, since the data KYEPRS and the data KEYHL are "L" and "H", respectively, it is detected that the function key Fn and the page down key PgDn are operated. Therefore, the CPU 19 sets a frequency, of the clock frequencies stored in the backup RAM 25, which corresponds to "Fn + PgDn", in the CPU clock register. In addition, the CPU 19 sets clock frequencies corresponding to the clock frequency, set in the CPU clock register, in the slow CPU clock register and the idle MCP clock register, respectively (step A4).

For example, in the case shown in FIGS. 3A and 3B, "EFI/4", "EFI/8", and EFI/8" are respectively set in the CPU clock register, the slow CPU clock register, and the idle MCP CPU clock register.

The CPU 19 sets "1" as the data KLHEN and "0" as the data KHLEN in the I/O register 13 (step A5) to prepare for detection of the next clock switching command. Thereafter, the flow returns to the main routine.

Assume next that the user operates the function key Fn and the page up key PgUp. The operation signal KEYPRS is set at high level. The first DFF 7 latches the high-level signal supplied to the D input terminal, and outputs a high-level Q signal. This signal is held in the I/O register 5 and is supplied, as a low-level signal, to the SMI terminal of the CPU 19 through the NOR gate 15 and the AND gate 17.

In response to the SMI interrupt signal, the CPU 19 starts the SMI interrupt routine shown in FIG. 5. In this case, since the function key Fn and the page up key PgUp are operated, the flow advances to step A6 to update the contents of the CPU clock register to a value corresponding to "Fn + PgUp" ("EFI" in the case shown in FIGS. 3A and 3B). In addition, the CPU 19 sets values corresponding to the value of the CPU clock register in the slow CPU clock register and the idle MCP CPU clock register, respectively. Thereafter, the CPU 19 sets "0" as the data KLHEN and "1" as the data KHLEN in the I/O register 13 (step A7).

In this manner, the internal clock of the CPU is arbitrarily switched between the two frequencies set in the backup RAM 25. In addition, an arbitrary CPU clock can be selected within the performance range of the CPU 19 by properly selecting a set of clock frequencies on the setup menu screen. The values held in the slow CPU clock register and the idle MCP CPU clock register are also changed in accordance with a change in clock frequency for the CPU 19.

Note that if the bus is set in a hold state or the MCP is set in an idle state, the CPU 19 is operated by an internal clock frequency set in the slow CPU clock register or the idle MCP CPU clock register.

(Second Embodiment)

In the first embodiment, the frequency of the CPU clock is switched between the two clock frequencies selected through the setup menu. However, the present invention is not limited to this. For example, the clock frequency may be switched in a larger number of steps. An embodiment of this type will be described below with reference to FIGS. 6 and 7.

Figure 6:
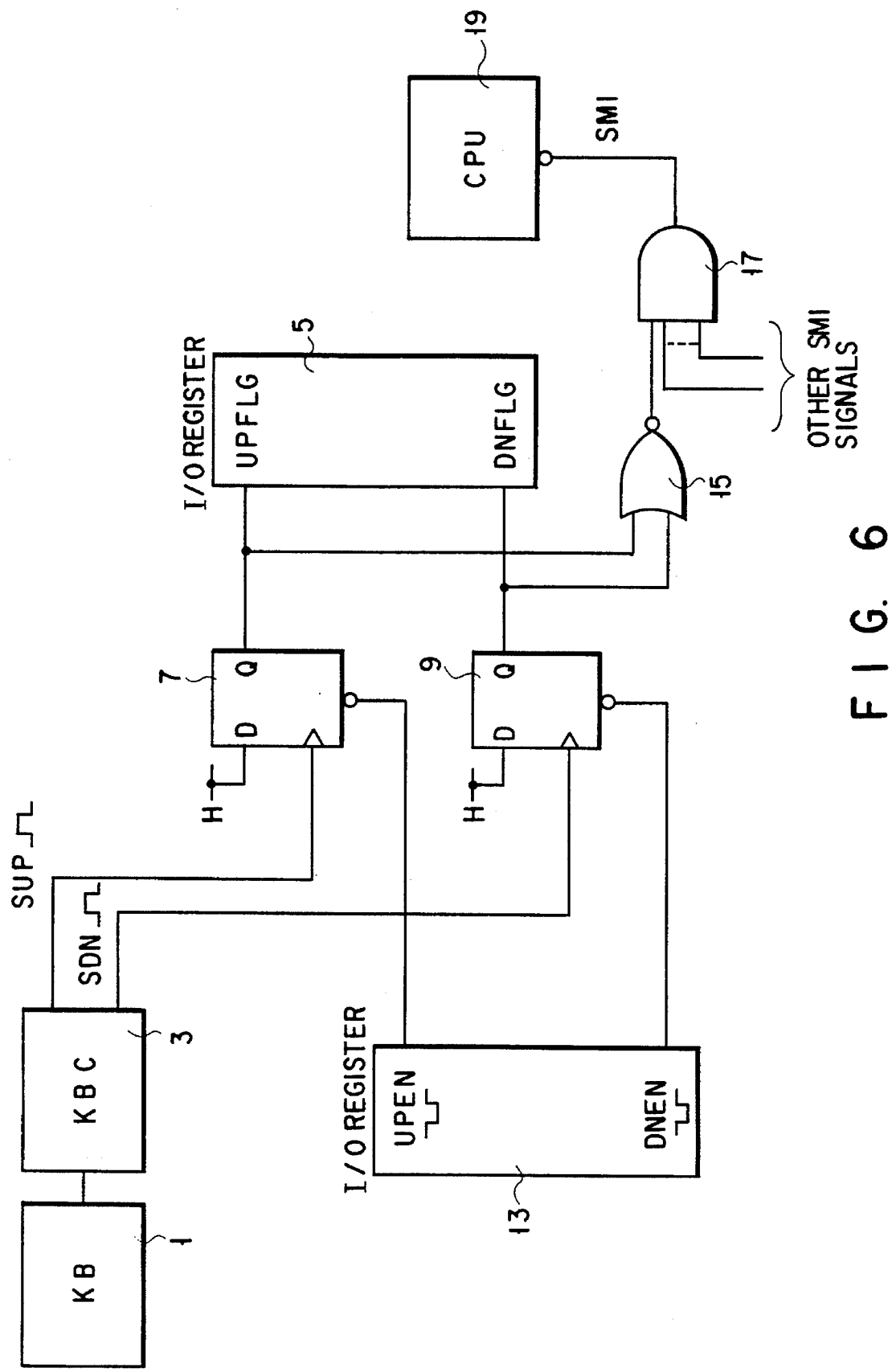
FIG. 6 is a block diagram showing the arrangement of a circuit for changing the frequency of an internal clock of a CPU according to the second embodiment of the present invention.

Referring to FIG. 6, a keyboard controller (KBC) 3 outputs a pulse signal SUP when a function key Fn and a page up key PgUp are operated, and outputs a pulse signal SDN when the function key Fn and a page down key PgDn are operated.

The pulse signal SUP is supplied to the clock terminal of a first D flip-flop (DFF) 7. The pulse signal SDN is supplied to the clock terminal of a second D flip-flop (DFF) 9. Data UPEN and DNEN set in an I/O register 13 are respectively supplied to the low active clear terminals of the first and second DFFs 7 and 9. Data is written in the I/O register 13 by a CPU 19.

The Q outputs from the first and second DFFs 7 and 9 are supplied to an I/O register 5 to be held as data UPFLG and DNFLG, and are supplied to the SMI terminal of the CPU 19 through a NOR gate 15 and an AND gate 17.

Figure 7:
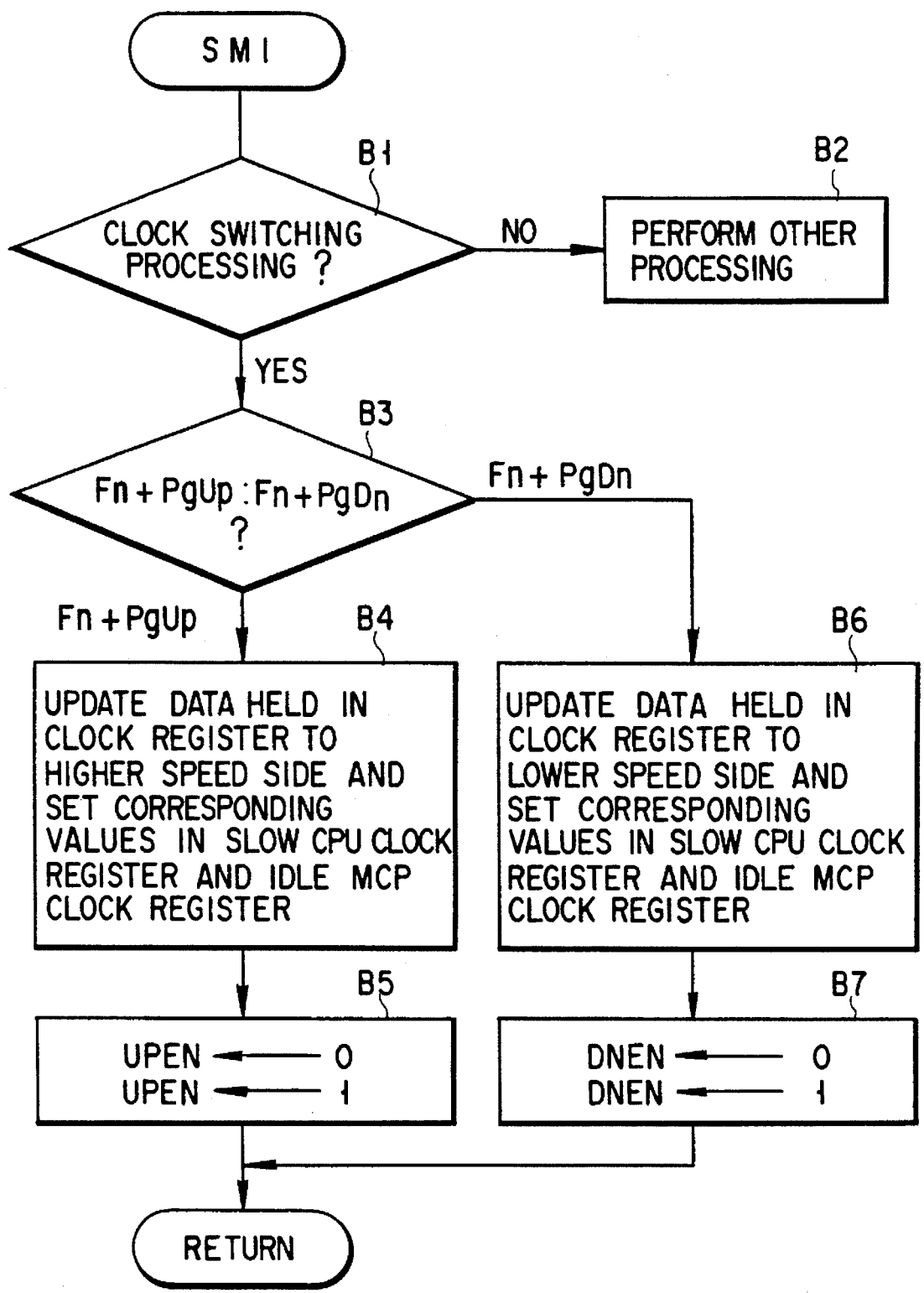
FIG. 7 is a flow chart for explaining an operation of changing the frequency of the internal clock of the CPU in the circuit shown in FIG. 6.

An operation of the second embodiment will be described next with reference to FIG. 7.

If, for example, the function key Fn and the page up key PgUp are operated, the keyboard controller 3 outputs the pulse signal SUP to the clock terminal of the first DFF 7. The first DFF 7 latches a high-level signal supplied to the D input terminal, and outputs a high-level Q signal. This high-level Q signal is set in the I/O register 5 and is supplied, as an SMI interrupt signal, to the CPU 19 through the NOR gate 15 and the AND gate 17. In response to this interrupt request, the CPU 19 starts the interrupt processing routine shown in FIG. 7.

The CPU 19 specifies the cause of the SMI interruption (step B1). If the SMI interruption is caused by a factor other than a clock frequency switching command, necessary processing is performed (step B2). In this embodiment, the CPU 19 determines on the basis of the contents of the I/O register 5 that the cause of the SMI interruption is a clock frequency switching command, and the flow advances to step B3.

In step B3, the CPU 19 detects whether the set of the function key Fn and the page up key PgUp or that of the function key Fn and the page down key PgDn is operated. In the embodiment, since the function key Fn and the page up key PgUp are operated, the CPU 19 reads out the value set in its CPU clock register, and updates the value to a clock frequency which is higher than it by one step. In addition, the CPU 19 sets values corresponding to the value of the CPU clock register in the slow CPU clock register and the idle MCP CPU clock register, respectively (step B4). Furthermore, the CPU 19 sets "0" as the data UPEN in the I/O register 13 to clear the first DFF 7. Thereafter, the CPU 19 sets "1" as the data UPEN in I/O register 13 to enable the first DFF 7.

If, for example, the function key Fn and the page down key PgDn are operated, the KBC 3 outputs the pulse signal SDN to the clock terminal of the second DFF 9. The second DF latches a high-level signal supplied to the D input terminal, and outputs a high-level Q signal. This high-level Q signal is set in the I/O register 5 and is supplied, as an SMI interrupt signal, to the CPU 19 through the NOR gate 15 and the AND gate 17. In response to this interrupt request, the CPU 19 starts the interrupt processing routine shown in FIG. 7. In this case, the flow advances from step B1 to step B6.

In step B6, the CPU 19 reads out the value set in its CPU clock register, and updates the value to a clock frequency which is lower than it by one step. In addition, the CPU 19 sets values corresponding to the value of the CPU clock register in the slow CPU clock register and the idle MCP CPU clock register, respectively. Furthermore, the CPU 19 sets "0" as the data DNEN in the I/O register 13 to clear the second DFF 9. Thereafter, the CPU 19 sets "1" as the data DNEN in the I/O register 13 to enable the second DFF 9.

With this arrangement, the clock frequency is sequentially updated in accordance with operations of the set of the function key Fn and the page up key PgUp and that of the function key Fn and the page down key PgDn. As a result, the clock frequency is sequentially increased or decreased. Note that an updated CPU clock may be displayed on a display unit 23. In addition, an operation of the set of the function key Fn and the page up key PgUp in a state wherein the maximum value is set in the CPU clock register, and an operation of the set of the function key Fn and the page down key PgDn in a state wherein the minimum value is set in the CPU clock register are neglected.

As has been described above, in the first and second embodiments, the CPU clock can be switched to an arbitrary value as required by the user.

Note that, as described above, in the 386™SL microprocessor available from Intel Corporation, the CPU clock frequency can be switched between a frequency represented by a value held in the CPU clock register and a frequency represented by a value held in the de-Turbo register in accordance with a signal supplied to the de-Turbo pin. However, since only two different values can be set in the de-Turbo register, and only two registers are used as switching control targets, the clock frequency cannot be freely changed. In addition, the values set in the idle MCP CPU clock register and the slow CPU clock register cannot be switched in accordance with a signal supplied to the de-Turbo pin. In the above-described embodiments, however, various clock frequencies can be switched and used by key operations, thus providing great convenience.

Note that the system may include both the above-described arrangement and the clock frequency changing function using the de-Turbo pin.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:

a microprocessor including a clock generating section which has a clock register with a value of an internal clock frequency set therein and a frequency divider for generating the internal clock frequency by frequency-dividing a fundamental clock in accordance with the value set in said clock register;

storage means, connected to said microprocessor, for storing a program for updating the value set in said clock register;

input means to designate an increase or decrease in the frequency of the internal clock, for outputting a designating signal designating an increase or decrease in response to a key operation;

register means, connected to said input means and said microprocessor, for holding the designating signal; and means, connected to said input means and said microprocessor, for supplying an interrupt signal to said microprocessor in response to the designating signal;

wherein said microprocessor (i) in response to the interrupt signal determines whether an increase or decrease is designated by reading out the designating signal held in said register means, and (ii) executes the program stored in said storage means to change the value of the internal clock frequency in accordance with the determination of increase or decrease.

2. A portable computer comprising:

a microprocessor including a clock generating section which has a clock register with a value of an internal clock frequency set therein and a frequency divider for generating the internal clock frequency by frequency-dividing a fundamental clock in accordance with the value set in said clock register;

input means for outputting a command designating an increase or a decrease, in response to a key operation; and changing means, connected to said input means and said microprocessor, for updating the value set in said clock register to change the value of the internal clock frequency, in accordance with the command outputted from said input means.

3. A portable computer according to claim 2, wherein said changing means comprises:

means, connected to said input means, for outputting a system management interrupt signal in response to the command outputted from said input means; and update means for updating the value in said clock register in response to the system management interrupt signal.

4. A portable computer according to claim 3, wherein said update means comprises:

first storage means for storing a plurality of sets of data designating predetermined frequencies (high, normal, low);

selecting means, connected to said input means and said storage means, for selecting one of said plurality of sets of data in response to the command outputted from said input means;

second storage means, connected to said selecting means, for storing data constituting the set selected by said selecting means; and writing means, connected to said input means and said second storage means, for changing the value of the clock frequency by writing the selected data stored in the second storage means to said clock register.

5. A portable computer according to claim 4, wherein said selecting means comprises:

means for displaying the plurality of sets of data on a setup menu screen; wherein one of the sets of data on the setup menu is selected by the key operation of the input means.

6. A portable computer according to claim 2, wherein said microprocessor comprises a plurality of registers each respectively used to set a value of a clock frequency; and said changing means comprises update means for updating the values set in each of said plurality of registers of said microprocessor in accordance with the command outputted from the input means.

7. A portable computer according to claim 2, wherein said microprocessor further comprises a slow clock register for setting a value of a clock frequency for a hold state of said microprocessor, and an idle clock register for setting a value of a clock frequency to be supplied when a math coprocessor connected to said microprocessor is in an idle state; and said changing means comprises update means for updating at least one of values set in said slow clock register and said idle clock register in accordance with the command outputted from the input means.

8. An apparatus for selectively generating a clock for computer operations based on input of an operator, the apparatus comprising:

at least one clock register for storing a frequency value;

frequency dividing means for receiving an externally supplied primary clock signal, for frequency dividing the primary clock signal to generate at least one secondary clock signal having a frequency equal to the frequency value in the at least one clock register, and for outputting the secondary clock signal;

first input means for receiving a first input from the operator and outputting a first signal in response to the first input;

second input means for receiving a second input from the operator and outputting a second signal in response to the second input; and interrupt means for receiving the first and second input signals, and for outputting an interrupt signal in response to the first interrupt signal or the second interrupt signal; and a microprocessor for receiving the interrupt signal, for receiving the first and second input signals in response to the interrupt signal, for increasing the frequency value stored in the at least one clock register in response to the first input signal, and for decreasing the frequency value stored in the at least one clock register in response to the second input signal.

9. The apparatus according to claim 8, wherein the first input means comprises a first key operated by the operator, and the second input means comprises a second key operated by the operator.

10. The apparatus of claim 9, wherein:

the at least one clock register comprises a CPU clock register, a slow CPU clock register and an idle clock register, with each clock register storing one frequency value; and the frequency dividing means divides the primary clock to generate a CPU secondary clock signal having a frequency equal to the frequency value stored in the CPU clock register, a slow CPU secondary clock signal having a frequency equal to the frequency value stored in the slow CPU clock register, and an idle secondary clock having a frequency equal to the frequency value stored in the idle clock register.

11. The apparatus of claim 8 further comprising a memory for storing a plurality of predetermined frequency values, with the microprocessor selecting a frequency value from the memory when the microprocessor increases the frequency value in the at least one clock register, and with the microprocessor selecting a frequency value from the memory when the microprocessor decreases the frequency value in the at least one clock register.

12. A process for generating a clock for computer operations comprising the steps of:

receiving input data from an operator by an input means, and outputting an input signal in response thereto;

interrupting a microprocessor in response to the input signal;

storing, when the microprocessor has been interrupted, a frequency value selected by a microprocessor according to the input signal, in a clock register;

receiving, by a frequency dividing means, a primary clock; and generating a secondary clock with a frequency equal to the frequency value stored in the clock register, by frequency division of the primary clock by the frequency dividing means.

* * * * *